(12) United States Patent
Richardson et al.

(10) Patent No.: US 6,971,236 B2
(45) Date of Patent: Dec. 6, 2005

(54) DOMESTIC COMBINED HEAT AND POWER UNIT

(75) Inventors: Adrian Robin Richardson, Silchester (GB); Heather Allderidge, Derby (GB)

(73) Assignee: MicroGen Energy Limited, (GB)

( * ) Notice: Subject to any disclaimer, the term of this patent is extended or adjusted under 35 U.S.C. 154(b) by 0 days.

(21) Appl. No.: 10/498,597

(22) PCT Filed: Dec. 18, 2002

(86) PCT No.: PCT/GB02/05776

§ 371 (c)(1),
(2), (4) Date: Jun. 9, 2004

(87) PCT Pub. No.: WO03/052254

PCT Pub. Date: Jun. 26, 2003

(65) Prior Publication Data

US 2005/0138926 A1  Jun. 30, 2005

(30) Foreign Application Priority Data

Dec. 19, 2001  (GB) ............................ 0130378

(51) Int. Cl.[7] ............................................ F01N 29/10
(52) U.S. Cl. ........................... 60/521; 60/522; 60/524
(58) Field of Search .......................... 60/517, 521, 522, 60/524

(56) References Cited

U.S. PATENT DOCUMENTS 3,062,000 A * 11/1962 Percival ........................ 60/792
3,456,438 A *  7/1969 Fokker et al. ................ 60/524
3,848,412 A * 11/1974 Michels et al. ............... 60/517
3,937,017 A    2/1976 Beschorner et al.

FOREIGN PATENT DOCUMENTS

GB    2 174 799 A     11/1986
WO    WO 01 90656 A   11/2001

* cited by examiner

Primary Examiner—Hoang Nguyen
(74) Attorney, Agent, or Firm—Needle & Rosenberg, P.C.

(57) ABSTRACT

A DCHP unit with a Stirling engine (1), a burner (3) and a supplementary burner (11). Water is heated by exhaust gas from the Stirling engine and from the supplementary burner. If a sensor (18) detects that the water temperature has risen indicating that there is insufficient demand for the heat in the exhaust gas, a fan (15), (20) which normally provides the flow of air to the supplementary burner is operated without firing the burner to generate a flow of cool air to cool the water.

4 Claims, 2 Drawing Sheets

DOMESTIC COMBINED HEAT AND POWER UNIT

CROSS REFERENCE TO RELATED APPLICATIONS

The present application claims priority to Great Britain Application No. 0130378.3, filed Dec. 19, 2001, which application is incorporated herein fully by this reference.

The present invention relates to a domestic combined heat and power unit comprising a Stirling engine having a burner to input heat energy into the engine head to drive a reciprocating member, the reciprocating member producing electrical power output via an alternator; a heat exchanger in which fluid receives heat from exhaust gases from the burner; a supplementary heater to heat the fluid in the heat exchanger; and a fan to generate a hot gas-stream from the supplementary heater through the heat exchanger. Such a unit will subsequently be referred to as "of the kind described".

Stirling engine technology of this type is well known, while a unit of the kind described is shown, for example, in GB application no. 0124985.3.

The Stirling engine requires heat to operate. Under many conditions, the thermal capacity of the domestic heating system can provide a use for the heat produced. However, when the radiators are turned off and hot water is not required, there is no heat demand. This will cause the temperature of fluid coolant to rise thereby degrading the performance of the Stirling engine. The awareness of the consumer to this need can solve this problem to some extent by turning on radiators. However, this cannot be relied upon to prevent the system from overheating.

Another way in which this can be prevented is to drive the Stirling engine according to the heat demand, and supply any additional electrical power requirement from the grid. However, this may not be possible, particularly during a power cut. Under such circumstances, the dchp unit can be set up to provide the heat requirement for the dwelling, and also provide a degree of electrical power as described in our co-pending application 0130378.3 under such circumstances, where no mains electricity is available, it is advantageous to be able to operate the unit to supply the maximum output of electrical power from the Stirling engine even when there is no heat demand.

According to the present invention, a unit of the kind described is characterised by a controller which detects when the heat generated by the Stirling engine exceeds a predetermined demand and operates the fan without operating the supplementary heater to generate an unheated air stream through the heat exchanger.

The present invention therefore makes use of components which are already available in the dchp unit to provide a way of dumping heat. The fan which normally operates in association with the supplementary heater is used to provide a flow of cold gas through the heat exchanger, thereby extracting waste heat from the heat exchanger which can be expelled through the normal exhaust flue. The fan has the added benefit of producing a flow of air past the engine as a whole, thereby cooling the engine pack.

Where it is possible to export power to the grid, this invention can be used to allow the engine to operate at its full output capacity, whatever local heat demand is present. This can provide economic benefits to the user, allowing the cost of imported power at times of high local power demand to be offset against the revenue from exported power at times of low local power demand.

In one arrangement, the fan additionally generates a flow of air to the Stirling engine burner and a splitter valve is provided to control the amount of air fed to the Stirling engine burner and supplementary heater. Alternatively, a second fan provides an air flow to the Stirling engine burner.

An example of a unit constructed in accordance with the present invention will now be described with reference to the accompanying drawings, in which.

Figure 1:
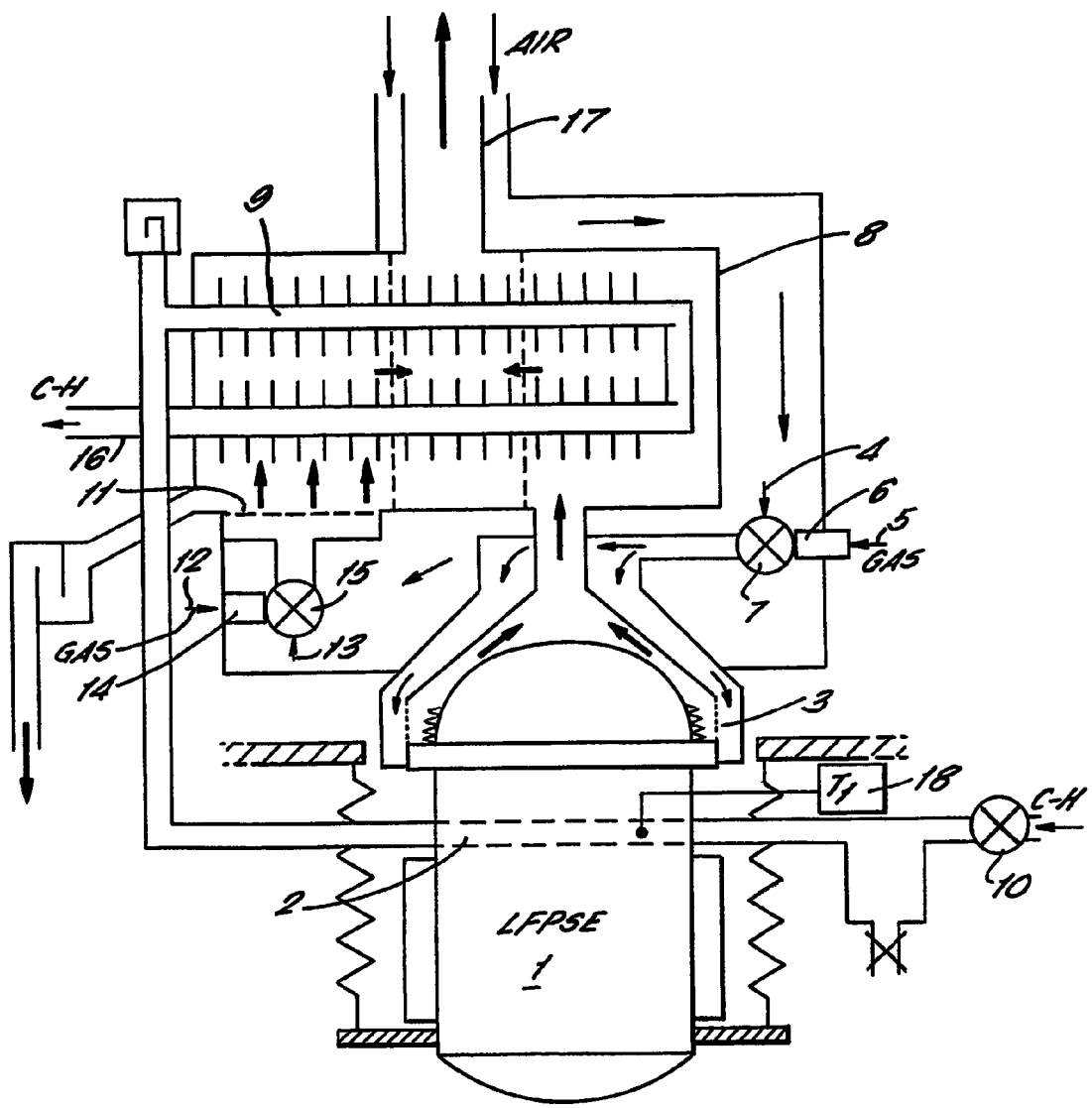
FIG. 1 is a schematic cross-section showing a first dchp unit.

The unit is based around a Stirling engine 1 from which heat is removed at the cooler 2 and into which heat is added by a burner 3 at the engine head. The burner 3 is provided with a mixture of an air stream 4 and a gas stream 5 which are mixed under the control of a gas valve 6. A fan 7 supplies the gas/air mixture to the burner 3. The combustion products which have heated the head are then fed to a heat exchanger 8 in which they give up heat to a water stream 9. This water stream has first been pumped by a pump 10 through the cooler 2 where its temperature is raised. It is then heated further by the exhaust gases from the burner 3 in the heat exchanger 8.

A supplementary burner 11 is provided to heat the water in the heat exchanger 8 downstream of the gases from the burner 3. The burner modulates to satisfy the heat demand of the dwelling taking into account the degree of heating provided by the Stirling engine 1. The supplementary burner 11 is supplied with a gas stream 12 and an air stream 13 under the control of a gas valve 14. The mixed gases are supplied to the supplementary burner 11 by a supplementary fan 15.

The water which may by now have undergone three stages of heating exits the heat exchanger 8 as heated water stream 16. The heated water stream 16 circulates around a circuit in the dwelling to supply hot water and/or heat for a central heating system, cooling as it gives up its heat to the dwelling. The cooled water then circulates back around the heating system described above driven by the pump 10 while the gases from the burner 3 and supplementary burner 11, having given up their heat to the water stream, flow out of the heat exchanger 8 along flue 17.

Under normal operation, where the heat demand of the dwelling is significant, the burner 3 and supplementary burner 11 will both be firing to provide the heat demand. If the demand for heat is low the supplementary burner is inactive and the heat produced by the burner 3 will be sufficient to satisfy the demand. If the demand for power is maintained, while the heat demand falls further, the temperature of the water in the circuit will rise as less heat is removed in the dwelling. A sensor 18 is provided within the cooler 2 to detect when the temperature of the water rises above a threshold value. This provides an indication that the heating circuit to which the hot water stream 16 is supplied cannot dissipate enough heat to maintain the temperature; differential across the Stirling engine.

Under these circumstances, in order to reject further heat, a control system receiving a signal from the sensor 18 will switch on the supplementary fan 15, without firing the burner 11 to provide a flow of cool air through the heat exchanger 8. The controller can vary the fan speed to maintain a beneficial water temperature through the Stirling engine cooler 2 allowing the generating efficiency to be maintained and hence consuming less fuel.

Figure 2:
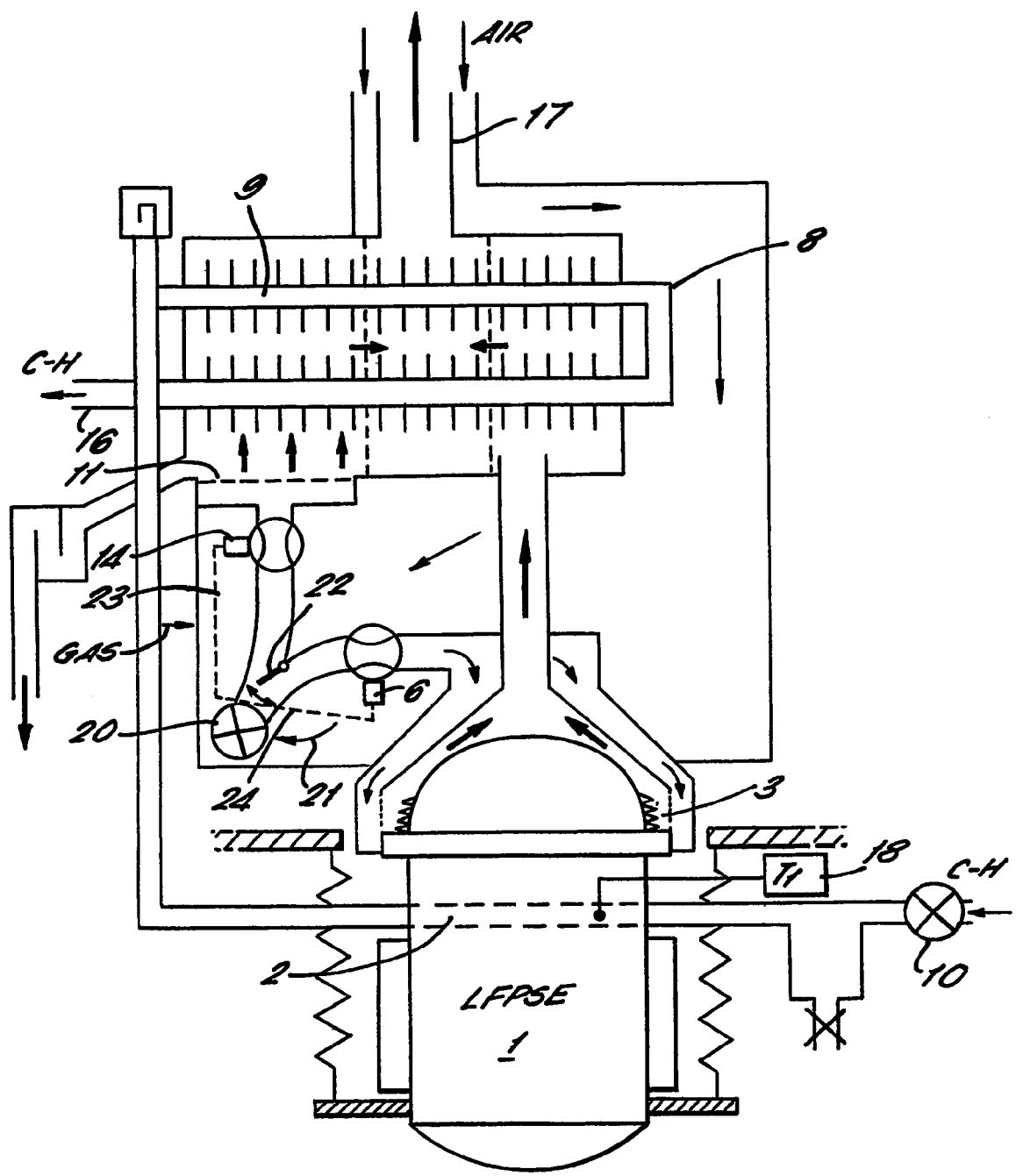
FIG. 2 is a schematic cross-section showing a second dchp unit.

A second example of a dchp unit is shown in FIG. 2. Most of the components of this unit are the same as those shown in FIG. 1. The same reference numerals have been used to designate the same components, and these components are not described again here.

The difference between FIG. 2 and FIG. 1 is that the dual fan 7, 15 arrangement of FIG. 1 with its associated gas and air streams and control systems has been replaced by a single fan 20 generating a single air stream 21. This single air stream is divided into two streams by a splitter valve 22, the operation of which is controlled by a servo motor according to the demands of the two burners, 3, 11. Gas streams 23, 24 are fed to the respective branches of the split air stream and controlled by valves 6, 14 in accordance with the burner requirements. Alternatively, the gas could be fed into the stream upstream of the splitter valve 22.

By analogy with FIG. 1, when the sensor 18 indicates that the temperature of the water rises above a threshold value, the vane within the splitter valve 22 may be rotated anti-clockwise in FIG. 2 to allow a flow of air to the supplementary burner 11. The supplementary burner remains inactive providing a flow of cool air through the heat exchanger 8. This provides the same effect as the arrangement shown in FIG. 1, but requires fewer components.

What is claimed is:

1. A domestic combined heat and power unit comprising a Stirling engine having a burner to input heat energy into the engine head to drive a reciprocating member, the reciprocating member producing electrical power output via an alternator; a heat exchanger in which fluid receives heat from exhaust gases from the burner; A supplementary heater to heat the fluid in the heat exchanger; and a fan to generate a hot gas stream from the supplementary heater through the heat exchanger; characterised by a controller which detects when the heat generated by the Stirling engine exceeds a predetermined demand and operates the fan without operating the supplementary heater to generate an unheated air stream through the heat exchanger.

2. A unit according to claim 1, wherein the fan additionally generates a flow of air to the Stirling engine burner and a splitter valve is provided to control the amount of air fed to the Stirling engine burner and supplementary heater.

3. A unit according to claim 1, wherein a second fan provides an air flow to the Stirling engine burner.

4. A unit according to claim 1, wherein the controller is part of a control system for the engine.

* * * * *